July 22, 1969     J. W. NELSON ET AL     3,457,387
FLOATING GAS-SHIELDING APPARATUS
Original Filed Oct. 20, 1965
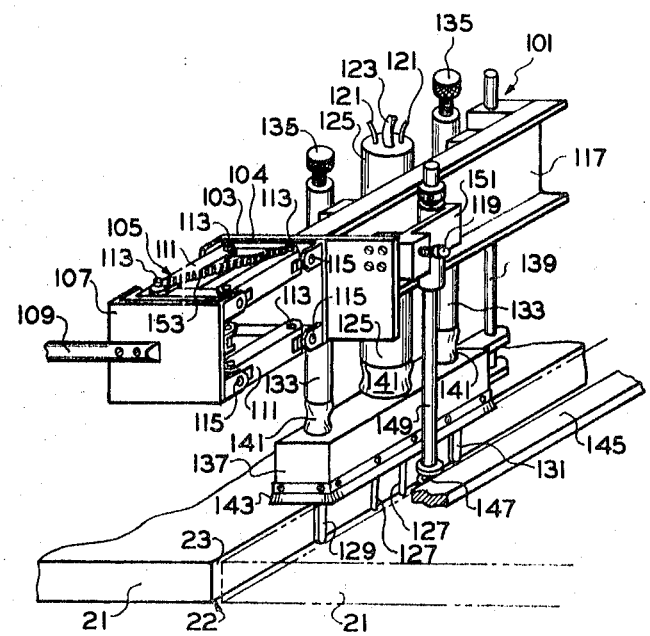
INVENTORS
JEROME W. NELSON
WALLACE J. LEWIS United States Patent Office 3,457,387
Patented July 22, 1969

3,457,387
FLOATING GAS-SHIELDING APPARATUS
Jerome W. Nelson, Houston, Tex., and Wallace J. Lewis, Sacramento, Calif., assignors to The Battelle Development Corporation, Columbus, Ohio, a corporation of Delaware
Original application Oct. 20, 1965, Ser. No. 498,734, now Patent No. 3,328,556, dated June 27, 1967. Divided and this application June 16, 1967, Ser. No. 646,704
Int. Cl. B23k 9/12, 9/16
U.S. Cl. 219—125
5 Claims

ABSTRACT OF THE DISCLOSURE

A floating gas-shielding apparatus for automatic welding along a narrow gap between metal plates having a shielding gas cup slideably mounted on the welding head and biased to be held in contact with the surface of the metal plates. Gas blocking rods extend from the weld head into the narrow gap on each side of the welding electrode so as to form a substantially pressure-tight chamber bounded by the joint, the gas blocking rods, and the gas cup. The weld head is moveably mounted to a carriage by means of a two-direction parallelogram linkage to allow both horizontal and vertical movement of the weld head.

---

This application is a divisional of our copending application Ser. No. 498,734, filed Oct. 20, 1965 now Patent No. 3,328,556, dated June 27, 1967.

Background of the invention

This invention relates to a floating gas-shielding apparatus used in welding thick plate materials separated by a groove. The apparatus has application to all thick plate structures for downhand welding and for out-of-position welding.

Prior gas-shielded arc-welding torch designs have employed gas-shielding nozzles which are fixed with respect to the welding torch. Such designs present problems when used in automatic welding apparatus, especially if a floating welding head is employed. The shielding nozzle may move one-half inch or further away from the surface of the joint during welding of irregular joints. Such a large spacing between the shielding nozzle and the surface of the plate would not provide adequate shielding for the joint. The apparatus of the present invention "floats" on the surface of the plates to be joined and maintains a pressurized chamber over the welding area which tends to eliminate aspiration of air in the weld zone.

The apparatus of this invention can be used for straight flat welds of abutting and T members, e.g., joints or seams in flat and curved plates. Flat or curved plates may be welded in various positions and from various directions, vertical, horizontal, overhead, or otherwise. Selected shielding gases known to those skilled in the art can be used for metals other than steel. For example, argon-$Co_2$ shielding gas mixtures are preferably used for steel, and argon helium mixtures are preferably used for aluminum and titanium.

The shielding gas apparatus of this invention has wide flexibility. The apparatus can be used with one filler wire or with several filler wires. The use of more than one filler wire increases the flexibility of the apparatus. For example, when using two filler wires the width of the joint gap can vary substantially and good sidewall fusion can be maintained. The filler wires are preferably positioned on opposite sides of the longitudinal center line of the joint with one filler wire guided along at a fixed distance from one joint edge and the other guided along at a fixed distance from the opposite joint edge.

Summary

The present invention provides a floating gas-shielding apparatus for use in automatic welding of metal plates separated by a joint. The gas-shielding cup rides on the plate surface and moves independently of the welding head. The gas cup has a flexible skirt which acts as a seal between the cup and the plate surface. The welding head is provided with gas-blocking rods which extend into the joint on each side of the welding electrode to form a substantially pressure-tight chamber bounded by the joint, the gas-blocking rods, and the gas cup. This chamber builds up shielding gas pressure throughout the welding zone which tends to eliminate aspiration of air in the weld zone.

One advantage of the present invention is to provide a gas-shielding apparatus that provides continuous and unvarying shielding gas protection during automatic welding or irregular joints.

A further advantage is to provide an apparatus that enables the production of welds having superior properties and appearance with an automatic welding system.

Still another advantage is to provide a gas-shielding apparatus that can be used on a floating welding head to eliminate fluctuating application of shielding gas.

Further understanding of the invention can be accomplished by reference to the attached drawings, wherein:

The figure is a perspective view of the floating gas-shielding apparatus of this invention mounted on a movable welding head which maintains the electrodes in spaced relationship to the joint sidewalls;

The figure shows the preferred embodiment of the floating gas-shielding apparatus of this invention mounted on a movable welding head. The welding head 101 has a plate 103 that is bolted to the plate 104 of a parallelogram mount 105 having a second plate 107 with a spindle that is attachable to the carriage (not shown). The carriage carries the spools of filler wire and drives the welding head along the joint.

The parallelogram mount 105 includes four bars 111—111 mounted between plates 104 and 104 having pivots 113—113 at each end that allow plates 104 and 107 to move horizontally with respect to each other and pivots 115—115 that allow plates 104 and 107 to move vertically with respect to each other. Consequently, the welding head 101 may move horizontally or vertically in a plane parallel to plate 107.

The welding head 101 includes a frame 117 attached to the plate 103. The filler wires 121—121 and shielding gas tube 123 pass through a barrel 125 that is attached to the frame 117. The barrel 125 also supports contact tubes 127—127 positioned in the joint gap 22. The frame also supports a forward guide 129 and a rear guide 131 which are positioned in the gap 22 to ride on the bottom of the joint and maintain the contact-tube-to-work distance. The guides 129 and 131 are each positioned in a barrel 133 and are each adjustable by means of an adjustment screw 135.

The shielding gas cup 137 is mounted to float with respect to the head 101 so that the cup is always riding against the top of the plates 21—21. The cup 137 is slidably mounted on a rod 139 affixed to frame 117. The shielding cup is also attached to barrels 125, 133—133 by means of flexible tubes 141. A flexible skirt 143 of a heat-resistant material such as Teflon impregnated fiberglass is also provided around the open end of cup 137 to seal the cup to the plate. The above arrangement of shielding cup 137, guides 129 and 139, and contact tubes 127—127 provides three shielding gas chambers in the joint. A first chamber is positioned between guide 129 and the nearest contact tube 127; a second chamber is positioned between contact tubes 127—127; and a third chamber is positioned between guide 131 and the nearest contact tube 127. Thus, the entire weld area is enclosed in a moving, closed, gas chamber. Baffles may also be provided to further define the gas chambers.

The welding head 101 is positioned laterally with respect to the joint by a bar 145 that serves as a guide for roller 147. The bar 145 is positioned parallel to the joint and clamped in place on one of the plates. The roller 147 is rotatably attached to a rod 149. The rod 149 is attached to a mount 151 slideably mounted on plate 103 and adjustable with respect to plate 103 by means of an adjusting screw 119. The parallelogram mount 105 is biased by means of a spring 153 to hold the roller 147 against the guide bar 145.

The welding head 101 is moved along by the carriage (not shown) attached to plate 107 and is guided through the gap 22 by means of the roller 147 and guide bar 145 and the guides 129 and 131. Shielding gas is admitted to cup 137 through tube 123 and is confined to the immediate area surrounding the weld zone. Thus, as the welding head moves along the joint, shielding gas flows into the gap and builds up a pressure which eliminates the aspiration of air in the welding area. The floating action of cup 137 maintains a substantially closed chamber in the welding area regardless of lateral or vertical movement of the welding head. When the apparatus is used for overhead welding, the head 101 is biased toward the "bottom" of the joint by means of counterweights (not shown).

A decided improvement was noted in the appearance of the weld surface when using the floating gas shield. The surface tends to be bright or have a very light straw-colored temper color rather than the black-colored oxidized surface obtained with other methods. Very light wire brushing produces a bright shining surface on the weld. The welds made with the present gas shield exhibited a significantly lower oxygen content than welds made using other shielding devices.

The floating gas-shielding apparatus of this invention is especially useful when used in combination with apparatus for automatic narrow-gap welding of thick plate. In narrow-gap welding, the electrodes are positioned in a narrow groove in close proximity (substantially 1/16 of one inch) to the joint sidewalls. Narrow-gap welding apparatus operates in the spray transfer range as contrasted to other automatic or semiautomatic gas-shielded metal-arc processes which operate in the droplet transfer, dip transfer or shorting-arc range to produce low heat inputs. Narrow-gap welding uses very low heat inputs, often as low as 7500 joules per inch and up to about 30,000 joules per inch with high deposition rates. It is often difficult to control weld zone heating in these low heat ranges. The apparatus of the present invention maintains a pressurized chamber over the weld zone which decreases the shielding gas flow required for good protection. This lower gas flow substantially decreases heat transfer through moving gases and thus aids in establishing uniform controlled heating in the weld zone.

It will be understood, of course, that while the forms of the invention herein shown and described, constitute preferred embodiments of the invention, it is not intended to illustrate all possible forms of the invention. It will also be understood that the words used are words of description rather than of limitation and that various changes in shape, size, and arrangement of parts may be made without departing from the spirit and scope of the invention herein disclosed.

What is claimed is:

1. A floating gas-shielding apparatus in combination with automatic narrow-gap welding apparatus comprising:
    (a) carriage means adapted to continuously move along the line of the narrow gap between metal plates to be welded;
    (b) a welding head, supporting an electrode, moveably mounted on said carriage to enable said head to move relative to said narrow gap;
    (c) means for feeding welding material into said gap;
    (d) a source of electrical power for forming an arc at the electrode to deposit molten metal within said narrow gap;
    (e) a shielding gas cup slideably mounted on said welding head and biased to be held in contact with the surface of the metal plates; and
    (f) gas blocking means mounted on said welding head and extending into said narrow gap on each side of the arc to form a substantially pressure-tight chamber bounded by the walls of the narrow gap, said shielding gas cup and said gas blocking means.

2. The apparatus of claim 1 wherein said welding head is moveably mounted to said carriage by means of a two-direction parallelogram linkage to allow both horizontal and vertical movement of said head.

3. The apparatus of claim 1 wherein a flexible skirt of a heat resistant material forms the lower edge of said gas shielding cup to provide a continuous seal at the plate surface regardless of surface irregularities.

4. The apparatus of claim 1 wherein the gas shielding cup is suspended from the welding head by at least one flexible tube through which the electrode extends.

5. In an apparatus for automatically welding along a narrow gap between metal plates, a construction for providing shielding gas to the weld area comprising:
    (a) a shielding gas cup slideably mounted on the welding head and biased to be held in contact with the surface of the metal plates; and
    (b) gas blocking means mounted on the welding head and extending into said narrow gap on each side of the welding electrode to form a substantially pressure-tight chamber bounded by the walls of the narrow gap, the shielding gas cup and said gas blocking means.

References Cited

UNITED STATES PATENTS

| | | | |
|---|---|---|---|
| 1,749,765 | 3/1930 | Hendrickson | 219—74 |
| 2,434,025 | 1/1948 | Wallace | 219—86 |
| 2,743,343 | 4/1956 | Anderson | 219—124 |
| 2,802,931 | 8/1957 | Hess | 219—124 |
| 3,123,702 | 3/1964 | Keidel et al. | 219—74 |
| 3,210,515 | 10/1965 | White | 219—74 |
| 3,301,993 | 1/1967 | Boyd et al. | 219—121 |

ANTHONY BARTIS, Primary Examiner

W. DEXTER BROOKS, Assistant Examiner

U.S. Cl. X.R.

219—72